Dec. 19, 1939. A. L. DOLD 2,183,551
HOSE CLAMP
Filed July 22, 1936
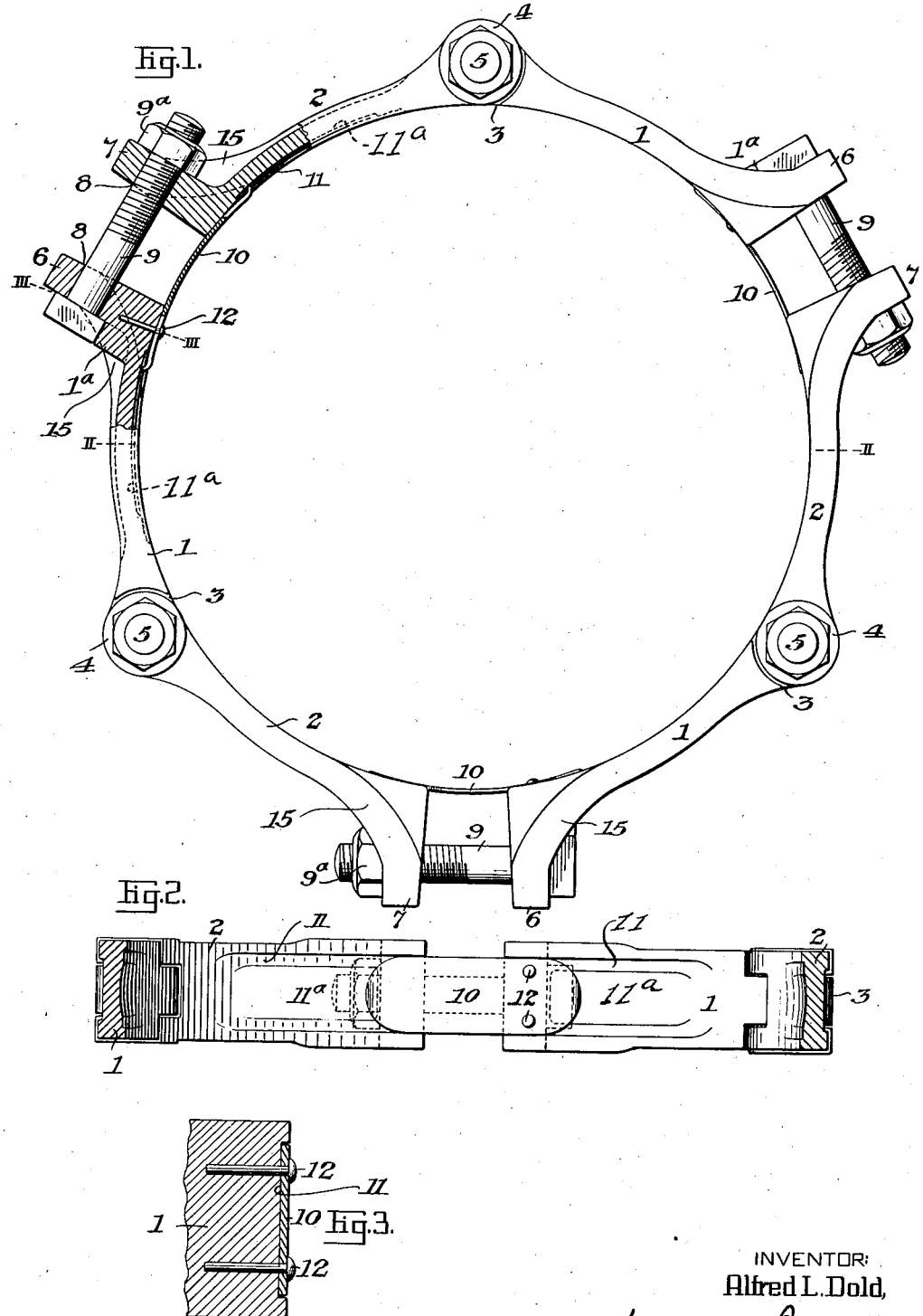
INVENTOR:
Alfred L. Dold,
by Murray C. Boyer
Atty.

Patented Dec. 19, 1939

2,183,551

UNITED STATES PATENT OFFICE 2,183,551

HOSE CLAMP

Alfred L. Dold, Drexel Hill, Pa.

Application July 22, 1936, Serial No. 91,944

2 Claims. (Cl. 24—19)

My invention relates to clamping devices for securing hose sections to coupling members or pipes, and the main object of my invention is to provide a completely flexible and adjustable structure more particularly available for use with hose sections of large diameter.

The structure forming the subject of my invention comprises a plurality of hinged members of arcuate contour adapted to fit around sections of hose and to be connected by suitable bolts passing through apertured ears or flanges at the ends of the several hinged members. I also provide spring plates or tongues, permanently secured at one end to a hinged member, which spring plates are designed to close the gaps between the bolt-connected flanges or ears of the clamping members.

These and other features of my invention are more fully set forth hereinafter; reference being had to the accompanying drawing, more or less diagrammatic in character, in which:

Figure 1 is a view in elevation of my improved clamping device, partly in section to illustrate details of construction.

Fig. 2 is a sectional view on the line II—II, Fig. 1, and

Fig. 3 is a fragmentary sectional view on the line III—III, Fig. 1.

My improved clamping device has been designed more particularly for use with large hose sections, which may be of a size ranging up to twenty inches or more in diameter, for instance. Hose clamps which include semi-circular members are not advantageously employed with these large hose sections, inasmuch as it is impossible to effect the desired grip except at opposite points; semi-circular or half members tending to develop into oval contours which do not give an effective grip or clamping action.

I propose to increase the gripping effect by the provision of flexible elements made up of hinged members and to assemble a series of the same—preferably not less than three—in the form of a clamp to engage and grip the hose sections.

In the drawing I have shown a clamp made up of three hinged elements, each made up of members 1 and 2; the member 1, for instance, having a tongue 3 fitting between ears 4 carried by the member 2, with a pivot pin or bolt 5 connecting the same. The opposite ends of the members 1 and 2 of these hinged elements terminate in flanged portions 6 and 7, apertured at 8 to receive connecting bolts 9. In order that the bolts may be held against turning when the clamp is being set up by proper operation of the nuts 9ª, the members 1 carry seats 1ª against which one face of the polygonal heads of the bolts may rest.

In order that the gaps between the flanged portions 6 and 7 of the respective hinged elements may be bridged to insure better and complete contact with the surface of the hose section being connected, I provide tongues 10 made up of sections of spring metal, which lie in recesses 11 formed in the surface of the clamping members; such spring tongues being so positioned as to lie substantially flush with the edge portions of the member to which it is secured. These spring tongues may be secured to the members by means of rivets as indicated at 12, and each member is recessed so that the free end of the tongue may lie in the same position with respect to the opposite hinged member as the connected end. There are, preferably, additional recesses 11ª, formed centrally of each of the recesses 11, and longitudinally of the members 1 and 2 making up the hinged elements, and these additional recesses permit the rounded ends of the spring elements to flex when the hose sections are being clamped.

The spring tongues 10 may have the same arcuate contour as the members 1 and 2, or they may be curved on a shorter radius, as indicated in Fig. 1, so as to function with various sizes of hose.

As may be readily understood, the hinging of the elements making up my improved clamping structure enables it to be readily opened for application to hose sections to be clamped, inasmuch as it is free to turn on three pivots, and any one of the bolts 9 may be removed when it is to be engaged or disengaged from a hose section.

By reason of the fact that the three hinged clamping elements provide what may be considered six-point contact with the hose, the engagement of such elements with the surface of the same more nearly approaches the circle and avoids the oval condition which is developed by the use of a pair of semi-circular clamping members.

The flanged ends or apertured ears of the clamping members which receive the connecting bolts 9 are preferably reinforced by the side flanges 15.

The clamping members may be made of any suitable metal and may be in the form of malleable castings.

While I have shown a specific embodiment of my invention, it will be understood that modifications may be made in the same without departing from my invention; all of which is deemed to be within the scope of the appended claims.

I claim:

1. A clamp for hose sections and the like comprising a plurality of hinged elements having an internal contour of suitable convexity; each of said hinged elements consisting of a pair of arcuate members pivotally connected together at a median point and each terminating in a radial flange at the end opposite the hinged connection, bolts for securing said end flanges, and arcuate tongues connected to the end of one member of the hinged elements and bridging the gap between the flanged ends of said clamping members; said clamping members being internally recessed for the reception of said tongues.

2. Flexible clamping means for complete encirclement of hose sections and the like, comprising a plurality of sets of independent and independently operable hinged elements of uniform size; each of said hinged elements consisting of a pair of members of arcuate contour and of substantially similar shape with one end of each member of the hinged elements in pivotal engagement with the end of an adjacent member and the opposite end of each member terminating in an outwardly-arranged substantially radial apertured flange for disposal in spaced relationship with respect to the substantially similar flange of an adjacent member, bolts connecting said flanged ends, and arcuate members bridging the gaps between the adjacent flanged ends of the members of the hinged clamping elements and permanently connected to one of said members; each of said members being internally recessed longitudinally of same to collectively provide space for the reception of said arcuate members.

ALFRED L. DOLD.